United States Patent
Graumann et al.

(10) Patent No.: US 9,669,931 B2
(45) Date of Patent: Jun. 6, 2017

(54) AIRCRAFT WITH CENTRALIZED GENERATED AND UNIFIED CABIN CONTROL PANEL DISPLAYS

(71) Applicant: Airbus Operations GmbH, Hamburg (DE)

(72) Inventors: Jean-Marc Graumann, Hamburg (DE); Marko Prasse, Hamburg (DE); Christian Riedel, Hamburg (DE)

(73) Assignee: Airbus Operations GmbH (DE)

( * ) Notice: Subject to any disclaimer, the term of this patent is extended or adjusted under 35 U.S.C. 154(b) by 225 days.

(21) Appl. No.: 14/463,837

(22) Filed: Aug. 20, 2014

(65) Prior Publication Data
US 2015/0058777 A1 Feb. 26, 2015

(30) Foreign Application Priority Data
Aug. 21, 2013 (EP) .................................. 13181192

(51) Int. Cl.
G06F 3/0484 (2013.01)
B64D 11/00 (2006.01)
G06F 9/44 (2006.01)
B64D 13/00 (2006.01)

(52) U.S. Cl.
CPC .......... B64D 11/0015 (2013.01); B64D 13/00 (2013.01); G06F 3/04842 (2013.01); G06F 3/04847 (2013.01); G06F 9/4443 (2013.01)

(58) Field of Classification Search
CPC . B64D 11/0015; B64D 13/00; G06F 3/04847; G06F 3/04842; G06F 9/4443
See application file for complete search history.

(56) References Cited

U.S. PATENT DOCUMENTS

| | | | |
|---|---|---|---|
| 2004/0145612 A1* | 7/2004 | Kopitzke | B64D 11/00 715/810 |
| 2007/0016870 A1 | 1/2007 | Doerr et al. | |
| 2007/0046680 A1* | 3/2007 | Hedrick | G01C 23/00 345/503 |
| 2009/0109223 A1* | 4/2009 | Schalla | B64D 11/0015 345/427 |
| 2010/0020038 A1* | 1/2010 | Vogel | G06F 3/041 345/173 |

(Continued)

FOREIGN PATENT DOCUMENTS

DE 10 2008 035 090 A1 3/2010

OTHER PUBLICATIONS

European Search Report (13181192.9) (Oct. 25, 2013).

*Primary Examiner* — Anil Bhargava

(74) *Attorney, Agent, or Firm* — Lerner, David, Littenberg, Krumholz & Mentlik, LLP

(57) ABSTRACT

A method for operating a control panel of an aircraft includes: sending display data from a control panel to a central controller of the aircraft, the display data including values to be displayed on a display screen of the control panel; loading, in the central controller, a display template from a central data storage, the display template including information for layouting the display data; generating a display page for the control panel in the central controller by merging the display data and the display template; sending the display page to the control panel; and displaying the display page on a display screen of the control panel.

13 Claims, 3 Drawing Sheets

(56) References Cited

U.S. PATENT DOCUMENTS

| | | | |
|---|---|---|---|
| 2010/0295777 A1* | 11/2010 | Detouillon | G01C 23/00 345/157 |
| 2013/0033503 A1* | 2/2013 | Besnard | G09G 5/397 345/502 |
| 2013/0124017 A1 | 5/2013 | Larsen et al. | |
| 2013/0218409 A1* | 8/2013 | Blain | B64D 11/0015 701/36 |
| 2013/0246008 A1* | 9/2013 | Lin | G06F 17/5018 703/1 |
| 2014/0074624 A1* | 3/2014 | Ying | H04L 65/403 705/14.66 |
| 2014/0075339 A1* | 3/2014 | Weskamp | H04L 65/403 715/753 |
| 2014/0156114 A1* | 6/2014 | Aymeric | G01C 23/00 701/3 |
| 2014/0289306 A1* | 9/2014 | O'Sullivan | G06Q 50/30 709/203 |
| 2016/0062618 A1* | 3/2016 | Fagan | G06F 3/04847 715/772 |

* cited by examiner

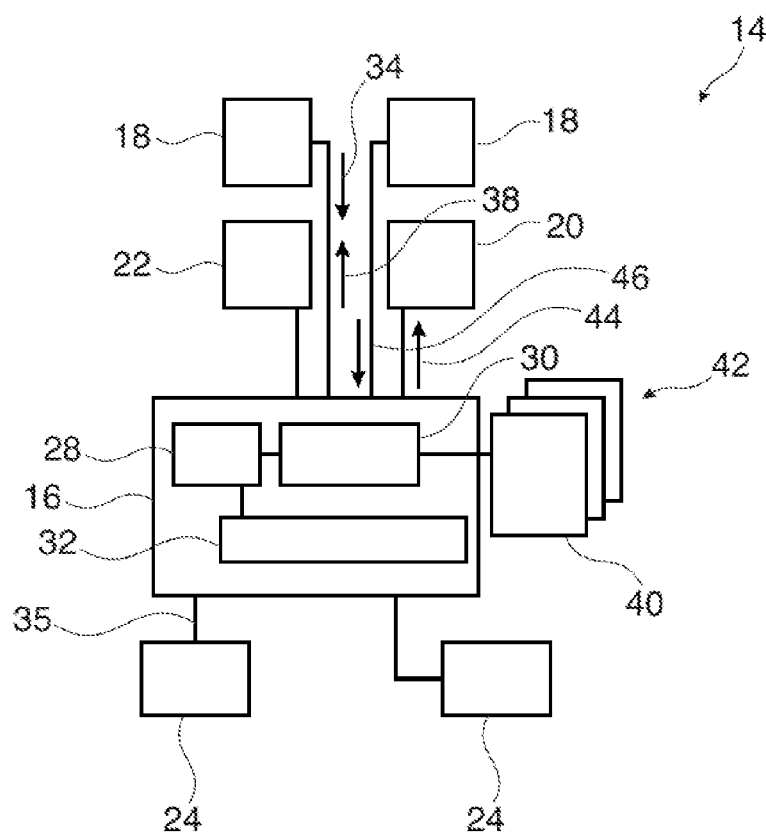
Fig. 2
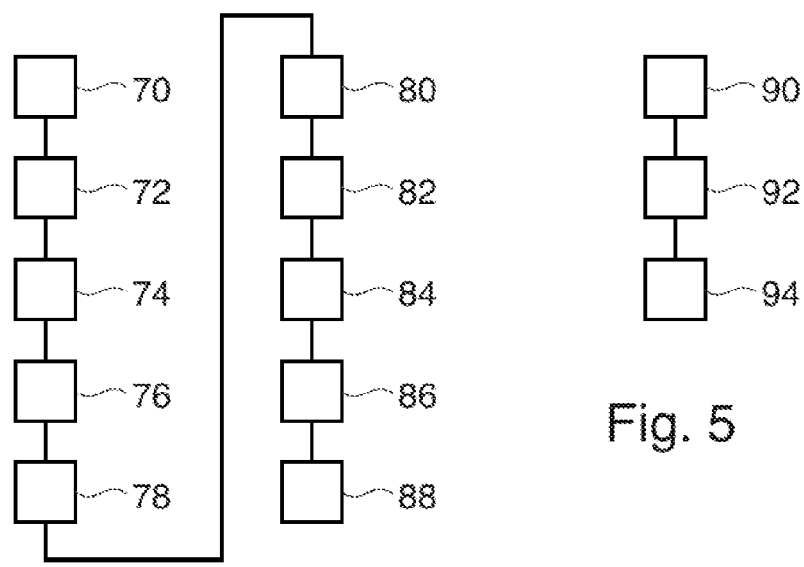
Fig. 4
Fig. 5

AIRCRAFT WITH CENTRALIZED GENERATED AND UNIFIED CABIN CONTROL PANEL DISPLAYS

BACKGROUND OF THE INVENTION

The invention relates to the field of human machine interfaces in an aircraft cabin. In particular, the invention relates to a method, a computer program and a computer-readable medium for operating a control panel of an aircraft. Furthermore, the invention relates to an aircraft system and an aircraft.

Passenger airplanes usually comprise one or more control panels for controlling cabin devices such as lights and air conditioning inside the passenger cabin. Also further information associated with the cabin, such as, for example, a passenger call or the current temperature, may be displayed on a control panel. DE 10 2008 035 090 A1 and US 2010 020038 A1 show examples of such control panels.

A control panel may be connected to a central controller of the aircraft (sometimes called Director (in the case of the cabin intercommunication data system, CIDS)), which provides communication interfaces between the control panel and the respective cabin device. However, some control panels are directly connected to their cabin device and control it directly. The control panels may have user interfaces designed by different manufacturers and usually the control functions are functionally grouped, i.e. with respect to controlled cabin devices. On the display of the control panel, different functions and/or applications for the aircraft cabin are usually handled in parallel. In this case, the user (normally a flight attendant) has to switch between the functions and applications and may have to search and enter the same kind of data in each application. Additionally, each application may have its own work and page flow.

BRIEF SUMMARY OF THE INVENTION

An aspect of the invention simplifies work processes for the cabin crew of an aircraft. Another aspect of the invention reduces the complexity of the cabin management system of an aircraft and thus saves costs, weight and/or maintenance time.

An aspect of the invention relates to a method for operating a control panel of an aircraft. A control panel may be seen as a human machine interface (HMI) between a controller for cabin devices such as a light, an air conditioning and/or a media player. A control panel may have a display screen for displaying information about the current state of cabin devices and may be adapted for receiving user commands. For example, the control panel may have a touch screen, for example, the display screen may be an interface for controlling, operating and service of cabin devices associated with the cabin of the aircraft.

Such a control panel may be located besides the entrance of the aircraft, in each cabin section and/or in the galley. Examples for such control panels are a (central) FAP (Flight Attendant Panel), one or more (local) AAP (Additional Attendant Panel) and control panels on portable crew equipment. In general, a control panel may be fixed mounted to the interior of the aircraft cabin or may be portable.

As an example, the control panel may be used for controlling the lights inside the cabin (or the cabin sections such as first class and second class), for regulating the cabin temperature, for playing audios and/or videos via a cabin multimedia system, for displaying passenger calls and/or for displaying important information such as messages from smoke sensors in the cabin.

According to an embodiment of the invention, the method comprises: sending display data from a control panel to a central controller of the aircraft, the display data comprising information and/or values to be displayed on a display screen of the control panel; loading, in the central controller, a display template from a central data storage, the display template comprising information for layouting the display data (for example depending on the display format and intended display content); generating a display page for the control panel in the central controller by merging the display data and the display template; sending the display page to the control panel; and displaying the display page on a display screen of the control panel.

Summarized, the images displayed on the display screens of the control panels are not completely generated locally in the control panel, but are generated at a central location in a uniform manner. A central controller such as a cabin intercommunication data system (CIDS) Director may generate the displayed images or at least data upon which such images may be generated without the need for additional layout data. The central controller may be seen as a single instance of a multi-domain and multi-function data aggregator, which is capable of generating highly integrated user interfaces, based on pre-defined templates for one or more control panels.

The method may be seen as a method for centralizing the generation and distribution of human machine interfaces for cabin operations. In such a way, multiple domains, in which layouting takes place, are integrated in one device. The actual image shown on a control panel is generated with the use of pre-defined templates. These templates are customizable according to functional availability, customer preferences and functional needs. An adaptation of the user interface of the control panel is then possible by an adaptation of the central templates, or via the selection of a new template set, without any impact on the functions providing the actual data. This may simplify the maintenance time and costs of the aircraft.

With the method, the user interfaces of control panels in the aircraft may be improved and harmonized by transferring the generation of display pages into a central controller, which will distribute the template-defined display pages to the various control panels. Furthermore, the generation of display pages may be simplified thereby reducing development and maintenance costs. The customization process may be simplified by offering a single customization point (for example a database storing the templates) for all cabin control panels. A harmonized data representation and a harmonized usability philosophy may be provided.

Since the control panels need only to deliver data and do not need to determine visualization aspects of their display pages, the control panels may be simplified. This may simplify the control system of the aircraft cabin.

A further benefit arises when new types of control panels need to be added, especially when these are not integrated into the hardware architecture (i.e. for portable devices). Adding these into the HMI handling requires little more than defining a new HMI template, without needing to modify the already certified software components present on the central server (e.g. CIDS Director)

Display data may comprise values and texts to be displayed on a display screen (but without the layout and/or formatting of the values and texts). Display data may also comprise information about control elements to be displayed, but without the layout of the control elements. A control element may be a text field, a button, a menu, a table, an edit field, a slider, etc.

A display template may comprise information about the formatting of text (text type, text style), about the layout of control elements. A layout of a control element may comprise colors, extensions, sizes of the control element and images (such as borders and/or background) for generating the control element. A display template furthermore may comprise the arrangement and/or positioning of control elements on a display page.

A display page may be an image or may contain all information necessary for generating an image that directly may be displayed on the display screen of the control panel.

According to an embodiment of the invention, the method further comprises: receiving further display data from a further controller of the aircraft; generating the display page in the central controller by merging the display data, the further display data and the display template. For example, the control panel and the further controller (for example associated or integrated in a cabin device) are both communicatively connected to the central controller (but not with each other). Data from the further controller may be integrated in the display page without a need for being processed by the control panel. For example, the actual cabin temperature may be received from an air conditioning and may be integrated by the central controller into a display page for controlling the air conditioning.

According to an embodiment of the invention, the method further comprises: receiving display related attributes of the control panel in the central controller; and loading the display template based on the display related attributes. The display related attributes may be at least one of: screen resolution, screen size, screen orientation and/or control panel usage of the control panel. Display related attributes may comprise hardware limitations of the display screen of the control panel. The central controller may be adapted for distributing the generated display pages to all connected control panels using a common style and behavior definition, but adapted to the requirements of each control panel (for example regarding screen resolutions, size, orientation and type of use).

According to an embodiment of the invention, the method further comprises: sending the display data in a device specific format to the central controller; transforming the device specific display data to device independent display data in the central controller; and generating the display page based on the device independent display data. It may be possible that different types of control panels that use different communication schemes are interconnected with the central controller. The central controller may have interface modules for translating the device specific display data into device independent display data that is processed by a template processing module. The generated display page may be translated back to a device specific format by the corresponding interface module.

According to an embodiment of the invention, the method further comprises: sending user inputs from the control panel to the central controller; transforming the user inputs into control commands in the central controller; and controlling a cabin device based on the received control data with the central controller. The central controller may comprise a control module for controlling cabin devices connected with the central controller. In such a way, the cabin devices may be controlled from more than one control panels. Also the above mentioned interface modules may translate device specific user input data into device independent control commands that may be processed by the control module of the central controller.

The functional modules may be implemented as programmed software modules or procedures, respectively; however, one skilled in the art will understand that the functional modules may be implemented fully or partially in hardware.

A further aspect of the invention relates to a method for operating a control panel of an aircraft, which may be suitable for supporting a workflow of a cabin crew of an aircraft. This method may be an embodiment of the method as described above and also embodiments of this method may be embodiments of the method as described above.

A workflow of the cabin crew may be defined by a flight phase of the aircraft. Flight phases may be: pre-flight, boarding, taxiing, takeoff, climb flight, cruising, descent flight, landing. During each flight phase, the cabin crew may have to perform specific work steps, which may be dependent from each other, which may be seen as a definition of a workflow. For example, during boarding, lights have to be switched on, certain passengers have to be guided to their seats or may need help (such as handicapped persons) and specific messages have to be broadcasted through the loudspeakers in the cabin.

According to an embodiment of the invention, the method comprises: setting a flight phase of the aircraft in a control panel of the aircraft; displaying a display page on a display screen of the control panel, the display page being selected for the set flight phase. A user interface/display page adapted to the workflow may be presented to the cabin crew. Only functions carried out within the scope of the user's responsibility and/or the current flight phase may be carried out with the display page, thus matching the interface of the control panel to the functional needs of the user. In such a way, the control panel may provide a process/workflow controlled human machine interface for cabin operations.

Instead of using the control panels only as simple non-adaptive menu-driven tools, the interface of the control panel, i.e. the display screen, may actively support workflows of the cabin crew, The amount of required user input (and thus also time) may be reduced, which may reduce the risk of erroneous input and may simplify training requirements for the cabin crew/the user. The method may lead to an improvement in work efficiency, reduction of operational errors and a reduction of training needs.

For example, the user interface of a touch screen of the control panel may provide a workflow defined layout. This layout may be generated as explained above in the central control unit via templates.

The control panel may present a user process steps taken from the normally expected workflows. This may present the user with a linear progression throughout a number of predefined operational scenarios which are matched to the operational sequence in the user's workload.

The display page may offer different cluster to the end user in line with individual needs. For example, a process/workflow controlled control panel for a cabin crew may guide the user through a number of display pages adapted to the tasks of the crew from the beginning of a flight through to its conclusion, offering workflows such as "Cabin Preparation", "Boarding", "Meal Serving", etc. or enables different functions related to locations e.g. "Reading Light", "Passenger Name", "Meal Order", "Defect Reports".

According to an embodiment of the invention, the flight phase is automatically set by a central controller of the aircraft, which is receiving flight data indicative of the flight phase. For example, the central controller may receive information from cockpit system about the current flight phase of the aircraft. For example, when the aircraft starts to taxiing, the central controller may receive corresponding information from the cockpit computers.

According to an embodiment of the invention, the flight phase is manually set by activating a control element on the display screen. However, it is also possible, that a user may switch to a display page for the actual flight phase by pressing or touching a correspondent button on the display screen.

According to an embodiment of the invention, the method further comprises: automatically controlling a cabin device in the aircraft after the flight phase has changed. In this way, specific workflows may be at least partially atomized. For example, at the beginning of the flight phase "boarding", the lights in all areas of the cabins may be turned on, the air conditioning may be set to a default value, specific music may be played and/or specific messages may be broadcasted via the cabin loudspeakers. All these work steps may be automatically performed by selecting and starting a specific flight phase with the control panel.

A further aspect of the invention relates to a computer program, which, when being executed by a processor (for example by processors of the central controller and/or a processor of the control panel), is adapted to carry out the steps of the method as described in the above and in the following. The central controller may be a computer integrated into the aircraft comprising a processor (CPU), memory and hardware interfaces for data communication with cabin devices and control panels. A control panel may be an embedded device or computer integrated into the aircraft or portable within the aircraft. Also the control panel may comprise a processor, memory and hardware interfaces for data communication with the central controller and the display screen.

A further aspect of the invention relates to a computer-readable medium, in which such a computer program is stored. A computer-readable medium may be a floppy disk, a hard disk, an USB (Universal Serial Bus) storage device, a RAM (Random Access Memory), a ROM (Read Only Memory), an EPROM (Erasable Programmable Read Only Memory) and a FLASH memory, for example a non-volatile computer-readable medium. A computer-readable medium may also be a data communication network, e.g. the Internet, which allows downloading a program code.

A further aspect of the invention relates to a (cabin control) system for an aircraft, the system comprising: a central controller and at least one control panel communicatively interconnected with the central controller. The at least one control panel comprises a display screen, which may be a touch screen. The central controller and the at least one control panel are adapted for performing the steps of the method as described in the above and in the following.

A further aspect of the invention relates to an aircraft comprising such a system. An aircraft may be a passenger aircraft or airplane.

It has to be understood that features of the methods as described in the above and in the following may be features of the system and/or the aircraft as described in the above and in the following and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

FIG. 2 schematically shows an aircraft system according to an embodiment of the invention.

FIG. 4 shows a flow diagram for operating a control system according to an embodiment of the invention.

FIG. 5 shows a flow diagram for operating a control panel according to an embodiment of the invention.

In principle, identical parts are provided with the same reference symbols in the figures.

DETAILED DESCRIPTION

Figure 1:
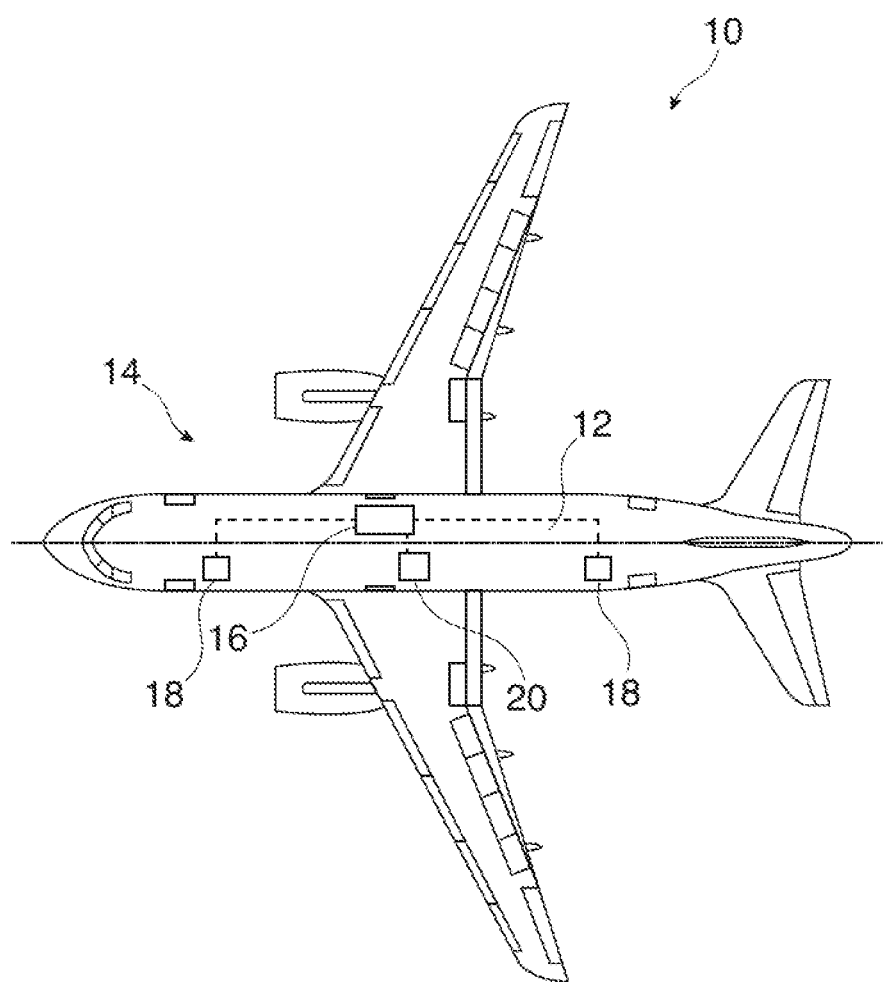
FIG. 1 schematically shows an aircraft according to an embodiment of the invention.

FIG. 1 shows an aircraft 10 comprising a passenger cabin 12 which may be managed by a system 14 interconnecting a central controller 16 with various input and display devices in the form of control panels 18 and cabin devices 20 such as lights, air conditioning, media players and electric movable window covers.

For example, a control panel 18 (the flight attendant panel) may be located near or besides an entrance to the aircraft and other control panels 18 (additional attendant panels) may be located in other sections of the cabin 12, for example in a galley. The control panels 18 may be attached to a cabin wall and may comprise a touch screen (see FIG. 3) for displaying color images and for inputting commands into the control panel 18.

FIG. 2 shows the system 14 more detailed. The central controller/central computing unit 16 is communicatively connected to several control panels 18 and, cabin devices 20, pure display devices 22 and external data sources 24, such as a smoke sensor or a cockpit computer.

The central controller 16 comprises an interface module 28 that is used for communicating with the control panels 18, display devices 20, cabin devices 22 and external data sources 24 and that may translate device specific data from the devices 18, 20, 22, 24 into device independent data for the other modules 30, 32 of the central controller 16 and vice versa.

A template processing module 30 of the central controller 16 receives display data 34 via the interface module 28 and generates display page data 36 that is sent back to the respective control panel 18. The display page data 38 is generated by merging the received display data 34 with a display template 40 that is loaded from a database 42 storing a plurality of configuration/display templates 40. The database 42, which may be stored in a memory of the central controller 16 or remote from the central controller, allows a function and/or representation change of the display pages without a full software update of the central controller 16.

The external data sources 24 (which may be provided by further controllers) may provide further display data 35 (such as the cabin temperature, the flight phase, flight altitude, etc.) used for generating the display page data 38.

A control module 32 of the central controller 16 comprises a functional pool of control functions that are configured for processing control commands 44 from the control panels 18 (and from other sources). For example, device specific user input 46 from a control panel 18 may be translated into a control command 44 in the control module 32, which forwards corresponding control commands to the cabin devices 20.

Figure 3:
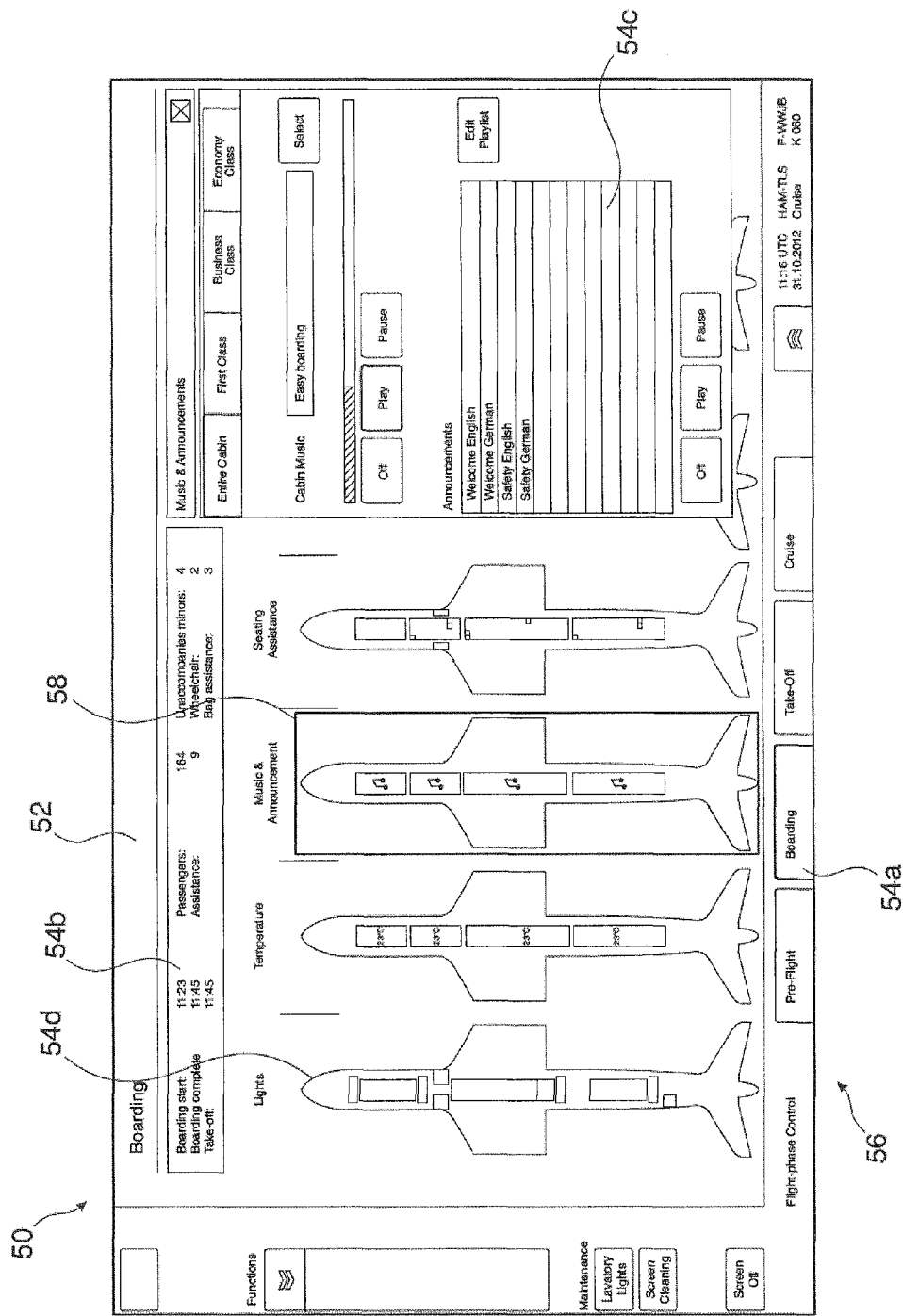
FIG. 3 shows a display screen for a control panel of a system according to an embodiment of the invention.

FIG. 3 shows a display screen 50, which displays a display page 52 for an actual flight phase: The display screen 50 may be a touch screen and the control panel 18 may comprise hardware for controlling the display screen 50 (i.e. setting its color pixels and generating the display page 52 from the display page data 38) and for evaluating the position of touches of a user on the surface of the display screen 50.

The display page 52 shows several control elements, such as buttons 54a, text fields 54b, lists 54c, graphics 54d, etc. Only exemplary control elements 54a, 54b, 54c are provided with reference numerals.

The layout (e.g. the form of the border) of the buttons 54a, the background and foreground colors, the text type, text colors, the arrangement of the control elements 54a, 54b, 54c, 54d may be stored in the template 40.

The display page 52 is selected according to the actual flight phase 56, in the shown example "boarding". The screen area above the button row is designed for facilitating the control of cabin devices 20 during this flight phase. A user may control the lights, temperature, sounds, and seat assistance with this page 52. In the shown example, an area 58 in the graphics 54d has been selected (by touching) and the user may now select the cabin music and the announcement to be played via cabin loudspeakers on the right side of the display page 52.

FIG. 4 shows a method for operating the system 14, in which the display pages 52 are generated centralized in the central controller 16.

In step 70, the control panel 18 generates display data 34 for requesting a new display page 52 from the central controller 34. For example, the display data 34 may contain the control elements 54a, 54b, 54c, 54d and the arrangement of the control elements but without their layout. As another example, the display data 34 may only contain a request for specific cabin related control functions such as "light control", "temperature control", etc., which will then be assembled by the central controller 16 to the display page 52. In the end of step 70, the display data 34 is sent from the control panel 18 to the central controller 16.

The display data 34 may be in a device specific format, i.e. the control panels 18 may be of different type and may generate different display data 34 for requesting the same display page 52. In step 72, the device specific display data is transformed to device independent display data in the interface module 28 of the central controller 16.

In step 74, display related attributes of the control panel 18, such as screen resolution, screen size, screen orientation, control panel usage, etc. may be received in the central controller 16. The display related attributes may be sent by the control 18 to the central controller, for example together with the display data 34. However, it is also possible that these attributes are already stored in the central controller 16, which only receives an identifier of the control panel 18 that may be sent together with the display data 34.

In step 76, the template processing module 30 loads a display template 40 from the central data storage 42 based on the received display data 34 and the display related attributes. The display template may comprise data about colors, styles and arrangement of control elements 54a, 54b, 54c, may comprise graphics 54d to be included into the display page 52.

In step 78, further display data 35 from a further controller 42 of the aircraft 10 may be received in the central controller. For example, the further display data 35 may comprise a cabin temperature. Also this further display data 35 may be processed by the interface module 28 into device independent further display data.

In step 80, the template processing module 30 generates the display page data 38 by merging the display data 34, the further display data 35 and the display template 40. The display page data 38 may comprise a pixel based image of the display page 52 or may comprise the complete information about rendering the display page 52 in the control panel 18.

In step 82, the central controller sends the display page data 38 to the control panel 18. It may be possible that the template processing module 30 generates device independent display page data 38 and that the interface module 30 transforms this data into device specific display page data 38 based on the attributes of the control panel 18.

In step 84, the control panel 18 receives the display page data 38 and displays the display page 52 on its display screen 50. The control panel 18 may comprise software and hardware for transforming the display page data 38 into the pixel data displayed by the display screen 50.

In step 86, a user touches the display screen 50 and the control panel 18 generates user inputs 46. The control panel 18 may comprise software and hardware for evaluating the position at which the user has touched the display screen 50 and/or for determining the control element 54a that has been activated. The user inputs 46 are then sent from the control panel 18 to the central controller 16.

The user inputs 46 may be transmitted as device specific user input data. In step 88, optionally, the device specific user input data may be transformed into device independent user input data by the interface module 28. The user inputs 46 are then evaluated in the control module 32, which then generates control commands 44, which are sent to the respective cabin device 20.

FIG. 5 shows a further flow diagram for operating the control panel 18 that may facilitate the workflow of the cabin crew and that may automate some of the work steps needed during specific flight phases.

In step 90, a flight phase 56 of the aircraft 10 is set in the control panel 18. For example, the flight phases may comprise "pre-flight", "boarding", "take-off" and "Cruise" as indicated in FIG. 3.

The flight phase may be automatically set by the central controller 16. For example, the central controller may receive flight data indicative of the flight phase 58 from the cockpit of the aircraft 10. The central controller 16 then may determine the actual flight phase from the flight data and may send the actual flight phase to all connected control panels 18.

Alternatively or additionally, the flight phase 58 may be manually set by activating a control element on the display screen 50 of the control panel 18, such as the button 54a.

In step 92, the control panel 18 displays the display page 52 on its display screen 50, which is selected for the set flight phase 56. For example, the display page may be generated according to steps 70 to 84 of the method of FIG. 4.

In step 94, a cabin device 20 in the aircraft 10 is automatically controlled after the flight phase 56 has changed. For example, when a user changes the actual flight phase 56 by touching the button 54a, the lights in the cabin 12 are turned on the temperature inside the cabin 12 is set to a predefined value and specific music and announcements (in general media files) are repeated via the loudspeakers and/or screens in the cabin 12.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for operating a control panel of an aircraft, the method comprising:
   sending display data from a control panel to a central controller of the aircraft, the display data comprising information to be displayed on a display screen of the control panel;
   loading, in the central controller, a display template from a central data storage, the display template comprising information for layouting the display data;
   generating a display page for the control panel in the central controller by merging the display data and the display template;
   sending the display page to the control panel; and
   displaying the display page on a display screen of the control panel.

2. The method of claim 1, further comprising:
   receiving further display data from a further controller of the aircraft; and
   generating the display page in the central controller by merging the display data, the further display data and the display template.

3. The method of claim 1, further comprising:
   receiving display related attributes of the control panel in the central controller; and
   loading the display template based on the display related attributes.

4. The method of claim 3, wherein the display related attributes are at least one of: screen resolution, screen size, screen orientation, control panel usage.

5. The method of claim 3, wherein the display related attributes of the control panel comprise limitations of the display screen of the control panel.

6. The method of claim 1, further comprising:
   sending the display data in a device specific format to the central controller;
   transforming the device specific display data to device independent display data in the central controller; and
   generating the display page based on the device independent display data.

7. The method of claim 1, further comprising:
   sending user inputs from the control panel to the central controller;
   transforming the user inputs into control commands in the central controller; and
   controlling a cabin device based on the control commands with the central controller.

8. The method of claim 1, wherein the control panel further comprises:
   hardware for setting color pixels of the display screen and/or for generating the display page from display page data;
   wherein the display page data is generated by merging the display data and the display template.

9. The method of claim 1, wherein the display data comprise information about control elements to be displayed without the layout of the control element.

10. The method of claim 1, wherein the display template comprises at least one of arrangement and positioning of control elements on the display page.

11. A non-transitory computer-readable medium, in which a computer program is stored, which, when being executed by a processor, is adapted to carry out the method for operating a control panel of an aircraft, the method comprising:
   sending display data from a control panel to a central controller of the aircraft, the display data comprising information to be displayed on a display screen of the control panel;
   loading, in the central controller, a display template from a central data storage, the display template comprising information for layouting the display data;
   generating a display page for the control panel in the central controller by merging the display data and the display template;
   sending the display page to the control panel; and
   displaying the display page on a display screen of the control panel.

12. A system for an aircraft, the system comprising:
   a central controller, and
   at least one control panel communicatively interconnected with the central controller, the at least one control panel comprising a display screen,
   wherein the central controller and the at least one control panel are adapted for performing a method comprising:
   sending display data from a control panel to a central controller of the aircraft, the display data comprising information to be displayed on a display screen of the control panel;
   loading, in the central controller, a display template from a central data storage, the display template comprising information for layouting the display data;
   generating a display page for the control panel in the central controller by merging the display data and the display template;
   sending the display page to the control panel; and
   displaying the display page on a display screen of the control panel.

13. An aircraft comprising a system for an aircraft, the system comprising:
   a central controller, and
   at least one control panel communicatively interconnected with the central controller, the at least one control panel comprising a display screen,
   wherein the central controller and the at least one control panel are adapted for performing a method comprising:
   sending display data from a control panel to a central controller of the aircraft, the display data comprising information to be displayed on a display screen of the control panel;
   loading, in the central controller, a display template from a central data storage, the display template comprising information for layouting the display data;
   generating a display page for the control panel in the central controller by merging the display data and the display template;
   sending the display page to the control panel; and
   displaying the display page on a display screen of the control panel.

* * * * *